US011965276B1

(12) United States Patent
Mix

(10) Patent No.: US 11,965,276 B1
(45) **Date of Patent: *Apr. 23, 2024**

(54) CUSTOM PIECE-TOGETHER QUILT TEMPLATE

(71) Applicant: Roberta Mix, The Villages, FL (US)

(72) Inventor: Roberta Mix, The Villages, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,829

(22) Filed: May 16, 2023

Related U.S. Application Data

(63) Continuation of application No. 17/715,527, filed on Apr. 7, 2022, now Pat. No. 11,661,691.

(51) Int. Cl.
*B43L 13/20* (2006.01)
*B43L 7/027* (2006.01)
*D05B 97/12* (2006.01)

(52) U.S. Cl.
CPC .............. *D05B 97/12* (2013.01); *B43L 7/027* (2013.01); *B43L 13/20* (2013.01)

(58) Field of Classification Search
CPC .......... D05B 97/12; B43L 7/027; B43L 13/20
See application file for complete search history.

(56) References Cited

U.S. PATENT DOCUMENTS

| | | | | |
|---|---|---|---|---|
| 6,935,039 | B1 | 8/2005 | Hess | |
| 7,194,970 | B2 | 3/2007 | Srebro | |
| 7,281,337 | B1 | 10/2007 | Dehlke | |
| 8,397,396 | B2 | 3/2013 | Nethery | |
| 9,458,867 | B2 | 10/2016 | Maunder | |
| 9,498,735 | B2 | 11/2016 | Mohanty | |
| D875,574 | S * | 2/2020 | Farnsworth | D10/64 |
| 10,781,545 | B2 | 9/2020 | Massey | |
| 11,142,866 | B2 | 10/2021 | Rieger | |
| 2004/0244664 | A1 | 12/2004 | Srebro | |
| 2006/0170156 | A1 | 8/2006 | Fabrige | |
| 2011/0290399 | A1 | 12/2011 | Raum | |
| 2020/0131680 | A1 * | 4/2020 | Massey | B25H 7/02 |
| 2021/0115608 | A1 | 4/2021 | Miksch | |

OTHER PUBLICATIONS

U.S. Appl. No. 11/661,691, dated May 30, 2023.

* cited by examiner

*Primary Examiner* — Yaritza Guadalupe-McCall
(74) *Attorney, Agent, or Firm* — Schwartz Law Firm, P.C.; Jeffrey J. Schwartz

(57) ABSTRACT

A custom piece-together quilt template incorporates first and second primary template sectors. Each template sector has an outer edge, converging side edges, a sector point at a convergence of said side edges, and a planar body. The planar body of each template sector defines at least one interior arc-shaped cutout. Complementary tabs and sockets are located along respective side edges of the first and second template sectors and function to temporarily join the template sectors together when using the quilt template.

14 Claims, 16 Drawing Sheets

70

CUSTOM PIECE-TOGETHER QUILT TEMPLATE

TECHNICAL FIELD AND BACKGROUND OF THE DISCLOSURE

The present disclosure relates broadly and generally to a custom piece-together quilt template and method for making a three-dimensional shirred quilt patch.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a custom piece-together quilt template. The quilt template incorporates first and second (primary) template sectors. Each template sector has a curved outer edge, converging side edges, a sector point at a convergence of said side edges, and a planar body. The planar body of each template sector defines at least one interior arc-shaped cutout. Means are provided for temporarily joining the first and second template sectors together when using the quilt template.

As used herein, the term "template sector" refers herein to one of the individual, generally triangular or "pie-shaped" parts which piece together to form the assembled quilt template. At least one side of each template sector may be rounded. In alternative embodiments, all sides of each template sector are straight. The outer perimeter of the fully assembled quilt template may be generally egg-shaped, entirely circular, oval or any other geometric shape.

According to another exemplary embodiment, all notional points along the arc-shaped cutout of the first template sector are equally spaced from the sector point of the first template sector.

According to another exemplary embodiment, all notional points along the arc-shaped cutout of the second template sector are equally spaced from the sector point of the second template sector.

According to another exemplary embodiment, both sector points of the first and second template sectors are located a centerpoint of the quilt template when assembled.

According to another exemplary embodiment, all notional points along the arc-shaped cutouts of the first and second template sectors are equally spaced from the centerpoint of the quilt template when assembled.

According to another exemplary embodiment, the converging side edges of at least one of the first and second template sectors define an angle of approximately 72 degrees.

According to another exemplary embodiment, the converging side edges of at least one of the first and second template sectors define an angle of approximately 34 degrees.

According to another exemplary embodiment, the converging side edges of at least one of the first and second template sectors define an angle of approximately 25 degrees.

According to another exemplary embodiment, the converging side edges of at least one of the first and second template sectors define an angle of approximately 66 degrees.

The term "approximately" as used in reference to the angles indicated herein means within a range of +/−10 degrees.

According to another exemplary embodiment, each of said first and second template sectors defines radially spaced inner and outer arc-shaped cutouts.

According to another exemplary embodiment, the means for temporarily joining the first and second template sectors together comprises a complementary tab and socket formed with respective adjacent side edges of said template sectors. The tabs and sockets may be friction-attached or "snapped together", or may be closely joined without frictional engagement. Examples of alternative means for joining may comprise structure including tongue and groove, hook and loop, adhesive tapes, magnets, edge coupling strips and the like. In one embodiment, the disclosure utilizes a small double-tab connector intended to mate with complementary sockets of adjacent template sectors.

According to another exemplary embodiment, the first and second template sectors are formed of a rigid thermoplastic material.

In another exemplary embodiment, the present custom piece-together quilt template incorporates at least 3 template sectors. Each template sector has a curved outer edge, converging side edges, a sector point at a convergence of said side edges, and a planar body. The planar body of each template sector defines at least one interior arc-shaped cutout. Means are provided for temporarily joining adjacent template sectors together when using the quilt template.

In yet another exemplary embodiment, the disclosure comprises a method for quilting. The method includes first selecting a fabric to be quilted. A custom piece-together quilt template is then assembled onto the fabric based on a relative weight of the fabric. The quilt template incorporates first and second (primary) template sectors. Each template sector has a curved outer edge, converging side edges, a sector point at a convergence of said side edges, and a planar body. The planar body of each template sector defines at least one interior arc-shaped cutout. Means are provided for temporarily joining the first and second template sectors together when using the quilt template. Using a marker, the assembled quilt template is traced onto the fabric along an outside perimeter of the template and at the interior arc-shaped cutouts of the first and second template sectors. The tracing identifies a marked perimeter, marked inseams, and marked interior arcs. The fabric is then cut along the marked perimeter and marked inseams to form a smaller fabric piece. The marking and cutting steps are repeated to create 4 identical fabric pieces. Each fabric piece has a border, an inseam and at least one marked interior arc. Basting stitches are added at the border and arcs of each fabric piece. The basting stitches have thread trails at respective ends of the border and arcs. The 4 fabric pieces are then sewn together along respective inseams. The assembled and sewn together fabric pieces are then shirred by pulling and tying off the thread trails. A fabric backing is then applied to the shirred fabric pieces to create a three-dimensional quilt patch. The three-dimensional quilt patch may then be incorporated with like patches into a finished article.

BRIEF DESCRIPTION OF THE DRAWINGS

Exemplary embodiments of the present disclosure will hereinafter be described in conjunction with the following drawing figures, wherein like numerals denote like elements, and wherein.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
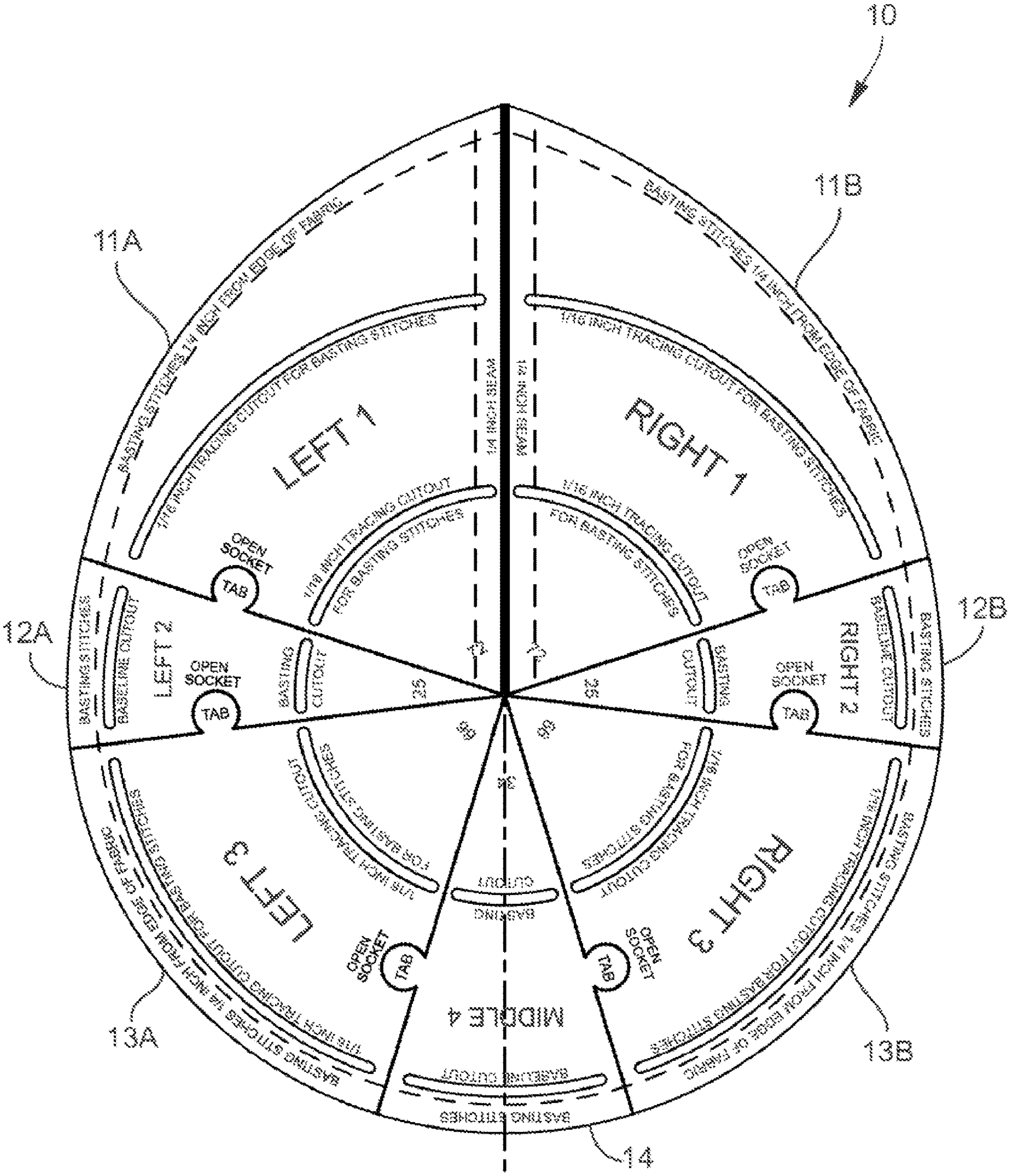
FIG. 1 is a plan view of an exemplary custom piece-together quilt template according to one embodiment of the present disclosure.

Referring now specifically to the drawings, a custom piece-together quilt template according to one exemplary embodiment of the present disclosure is illustrated in FIG. 1 and shown generally at broad reference numeral 10. The exemplary template 10 is used in a process for making a shirred three-dimensional circular shirred quilt patch 100. See FIG. 15. The exemplary quilt patch 100 may then be combined together with similar patches 100A-100D into a larger finished quilted product 200, such as that shown in FIG. 16. Steps of an exemplary process for making the three-dimensional quilt patch 100 are described further below.

Figure 2:
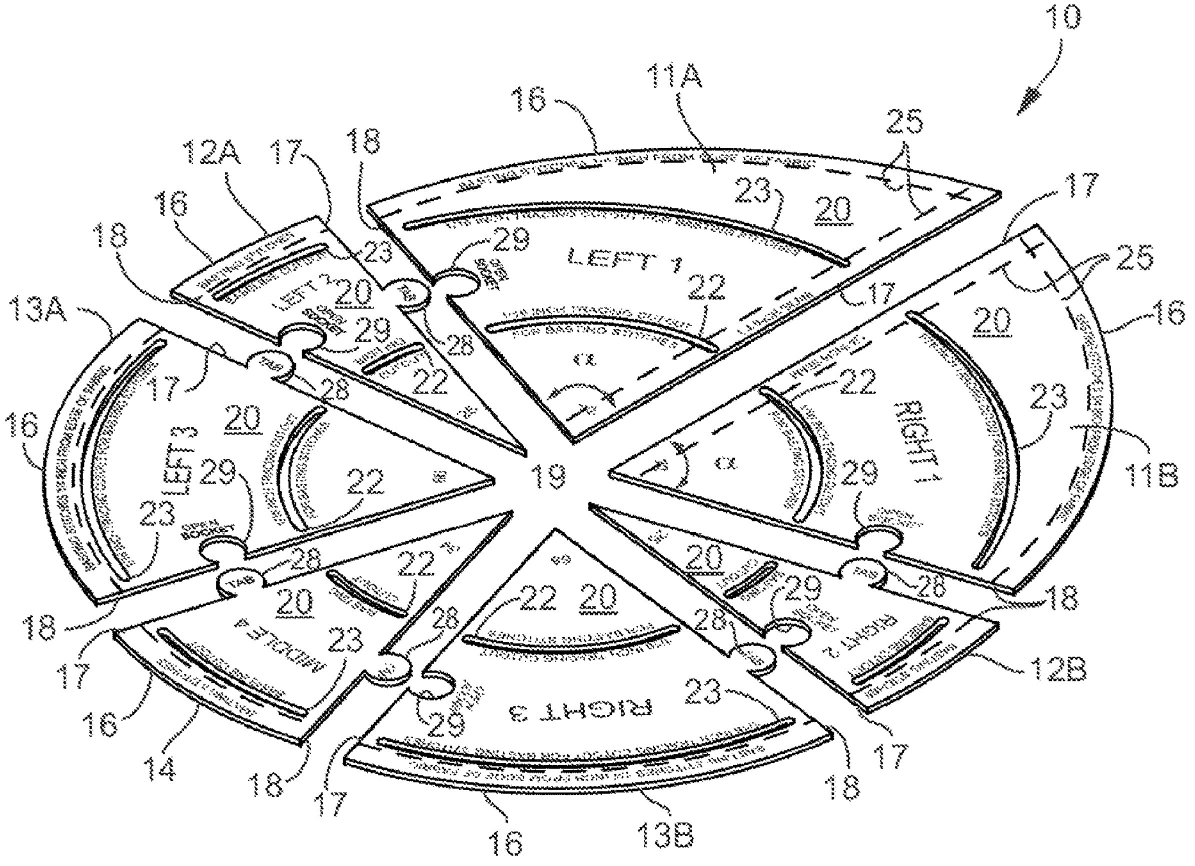
FIG. 2 is a perspective view of the exemplary quilt template with the various template sectors disassembled.

As best shown in FIGS. 1 and 2, the piece-together template 10 of the present disclosure incorporates a number of template sectors 11A, 11B, 12A, 12B, 13A, 13B and 14, identified in the drawings as: LEFT 1, RIGHT 1, LEFT 2, RIGHT 2, LEFT 3, RIGHT 3, and MIDDLE 4. Template sectors LEFT 1 and RIGHT 1 are considered "primary sectors", as these sectors 11A, 11B would be used in each of the exemplary template configurations described further herein. Each of the template sectors 11A, 11B, 12A, 12B, 13A, 13B, 14 has a curved outer edge 16, converging side edges 17, 18, a sector point 19 at a convergence of the side edges, and a flat planar body 20. The converging side edges 17, 18 of each template sector define an angle (a). In the exemplary embodiment, the primary sectors LEFT 1 and RIGHT 1 each define an angle of approximately 72 degrees, template sectors LEFT 2 and RIGHT 2 each define an angle of approximately 25 degrees, template sectors LEFT 3 and RIGHT 3 each define an angle of approximately 66 degrees, and the template sector MIDDLE 4 defines an angle of approximately 34 degrees.

The planar body 20 of each template sector 11A, 11B, 12A, 12B, 13A, 13B, 14 has radially spaced inner and outer arc-shaped cutouts 22, 23. All notional points along the inner arc-shaped cutout 22 are equally spaced apart from the sector point 19, and all notional points along the outer arc-shaped cutout 23 are likewise equally spaced apart from the sector point 19. Dashed-line indicia 25 are located along a border adjacent the outer curved edge 16 of each template sector 11A, 11B, 12A, 12B, 13A, 13B, 14, and along a border adjacent side edges 17 of the primary template sectors 11A, 11B—or, LEFT 1 AND RIGHT 1. The side edges 17 of template sectors 11A, 11B are straight and continuous. The dash-line indicia 25 are used as a guide to indicate portions of the fabric to be stitched during the quilting process. The other side edges 18 of primary template sectors 11A, 11B and side edges 17, 18 of template sectors 12A, 12B, 13A, 13B, 14 comprise respective complementary tabs 28 and sockets 29 designed for temporarily joining selected template sectors together in a custom configuration. As discussed further below, the exact template configuration is based on a relative weight of the fabric to be used in the quilt patch.

Figure 3A:
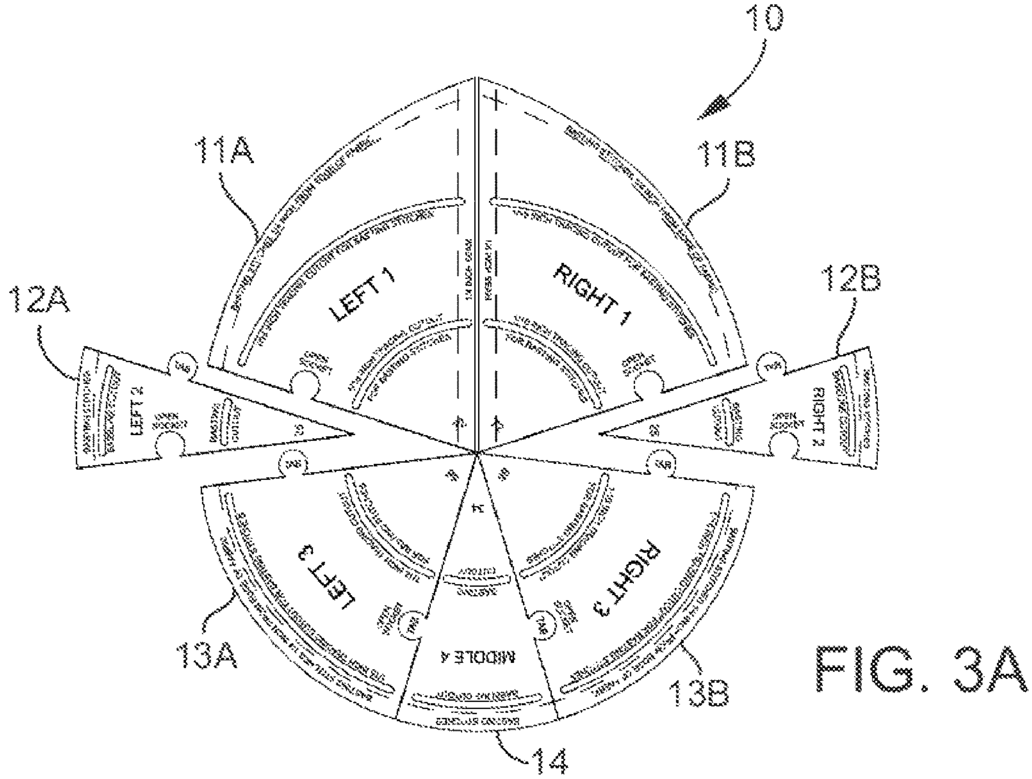
FIGS. 3A and 3B demonstrate arrangement of the template sectors in a first alternative template configuration.
Figure 3B:
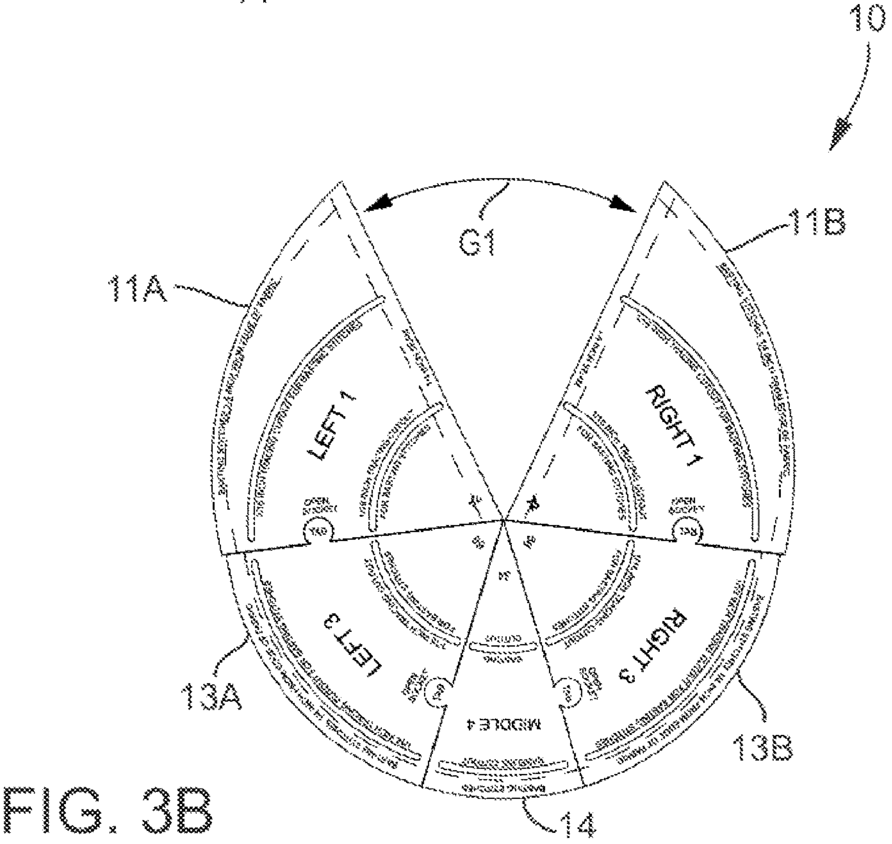
Figure 4A:
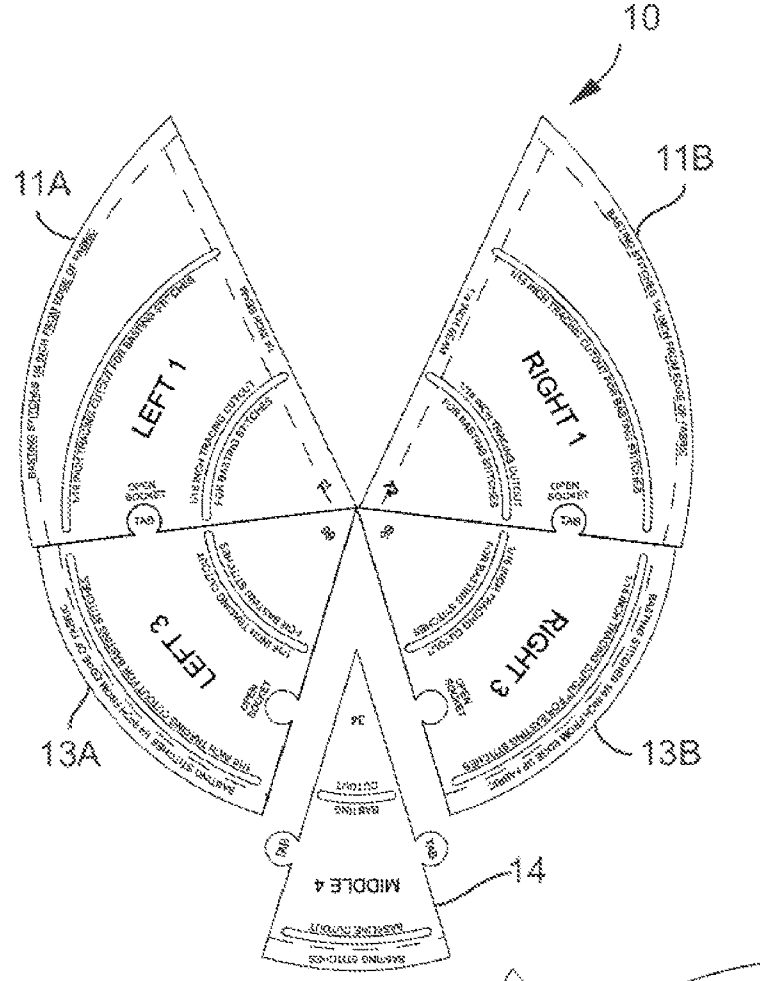
FIGS. 4A and 4B demonstrate arrangement of the template sectors in a second alternative template configuration.
Figure 4B:
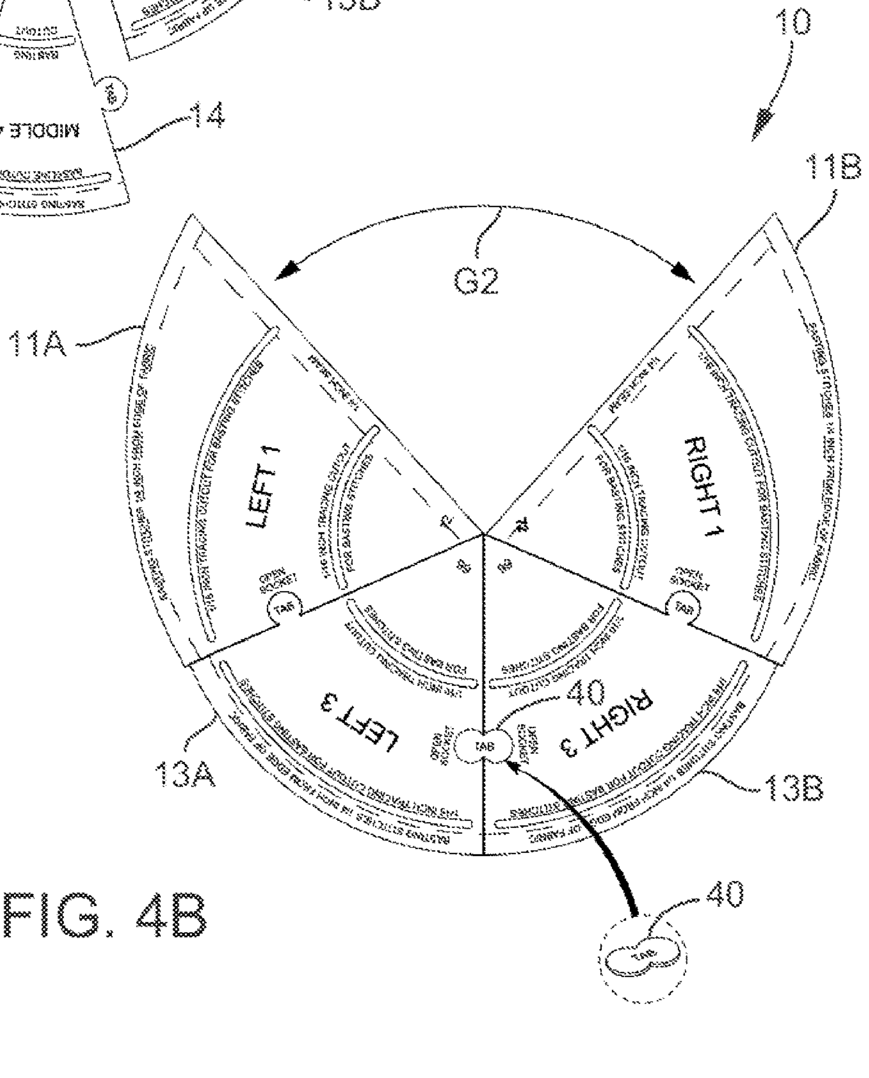
Figure 5:
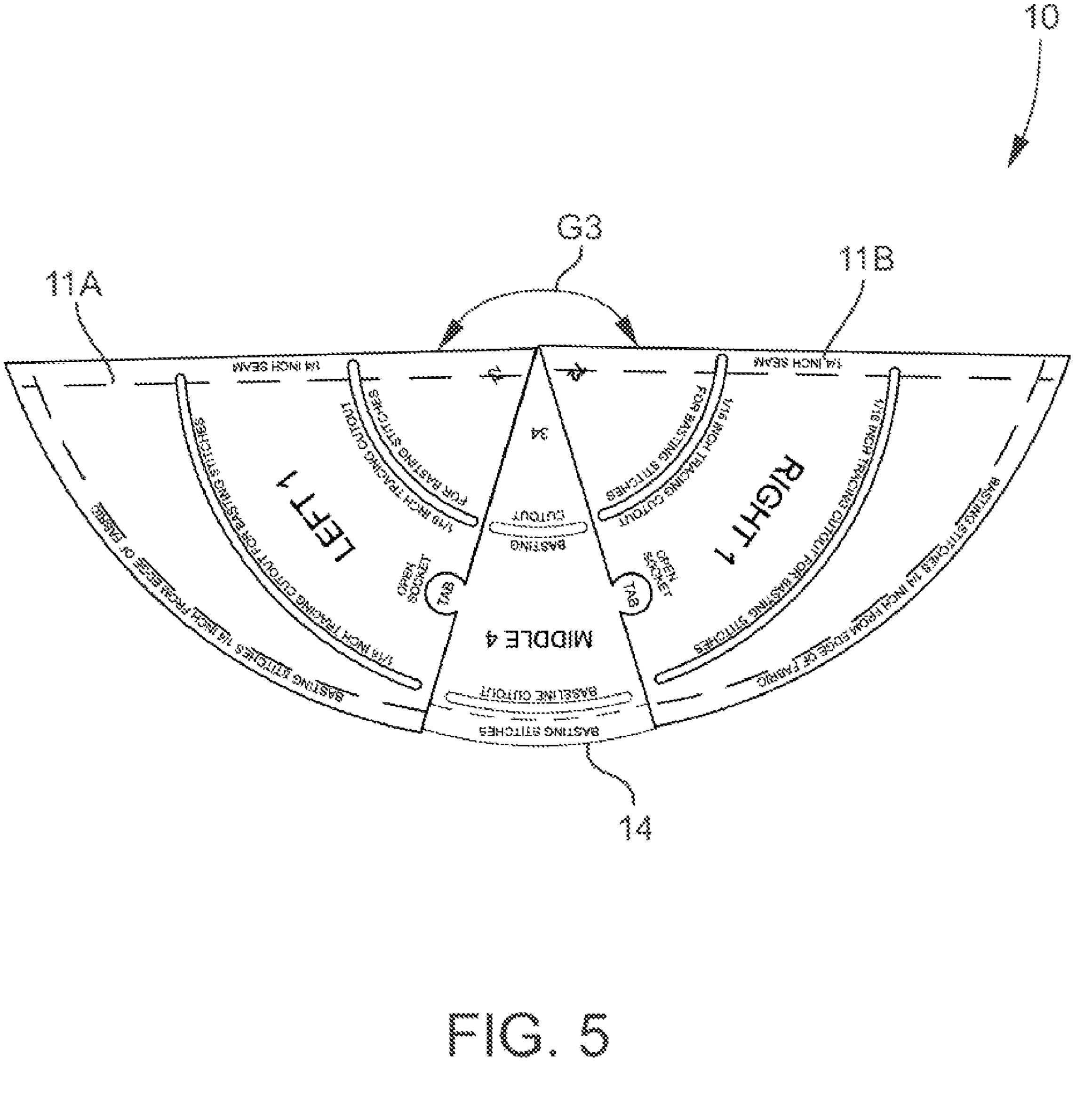
FIG. 5 shows the assembled template sectors in a third alternative template configuration.
Figure 6A:
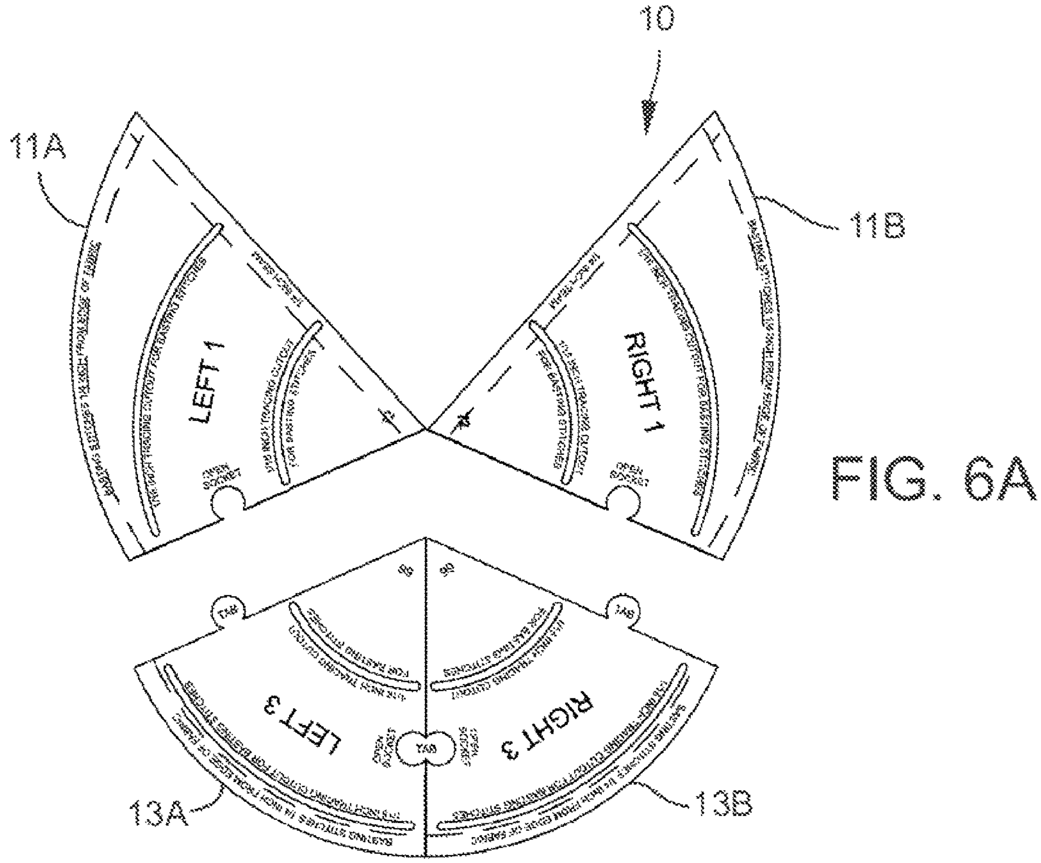
FIGS. 6A and 6B demonstrate arrangement of the template sectors in a fourth alternative template configuration.
Figure 6B:
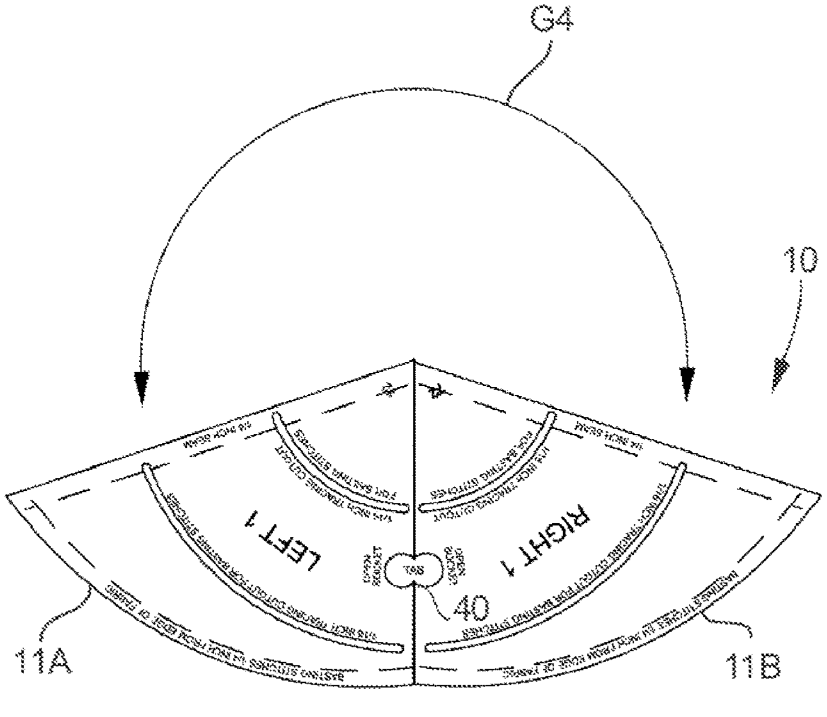

When the template sectors 11A, 11B, 12A, 12B, 13A, 13B, 14 are assembled, as shown in FIG. 1, all sector points 19 locate at a centerpoint 30 of the template 10, such that the inner and outer arc-shaped cutouts 22, 23 combine to form concentric broken circles. In the quilting process of the present disclosure, a continuous peripheral edge 32 of the assembled template 10 and arc-shaped cutouts 22, 23 of each template sector 11A, 11B, 12A, 12B, 13A, 13B, 14 are traced using a suitable marker (e.g., #2 or HB pencil) onto the fabric to be cut. The exemplary template configuration of FIG. 1 is especially applicable for use with lightweight fabrics (2 oz/$y^2$ to 4 oz/$y^2$), such as organdy, chiffon and silk. Such fabrics generally require a fully assembled or "larger size" template in order to properly mark and cut fabric pieces of sufficient size to create the fullness needed for the exemplary 3D quilt design. As demonstrated in FIGS. 3A and 3B, the size of the quilt template 10 is reduced in a first alternative configuration by removing template sectors 12A, 12B (LEFT 2 and RIGHT 2), thereby creating a gap "G1" of approximately 50 degrees in the fabric to be cut. The complementary tabs 28 and sockets 29 align and mate to temporarily join the template sectors 11A, 11B, 13A, 13B, 14 together. This template configuration might be used with light to medium weight fabrics (4 oz/$y^2$ to 6 oz/$y^2$). The size of the quilt template 10 may be further reduced in a second alternative configuration by removing template sector 14 (MIDDLE 4), as demonstrated in FIGS. 4A and 4B. This results in a gap "G2" of approximately 84 degrees in the fabric to be cut. In this configuration, a separate double-tab connector 40 is used to temporarily join together the template sectors 13A, 13B (LEFT 3 and RIGHT 3). This template configuration is applicable for heavier fabrics, such as 6 oz/$y^2$ to 10 oz/$y^2$ fabrics. FIG. 5 illustrates a third alternative template configuration comprising template sectors 11A, 11B, and 14 (LEFT 1, RIGHT1 and MIDDLE 4) temporarily joined together by complementary tabs 28 and sockets 29. This results in a gap "G3" of approximately 182 degrees in the fabric to be cut. In the fourth alternative configuration shown in FIGS. 6A and 6B, the template sector 14 (MIDDLE 4) is removed and the double-tab connector 40 used to join together the primary template sectors 11A, 11B (LEFT 1 and RIGHT 1). This creates a gap "G4" of approximately 216 degrees in the fabric to be cut. This template configuration would be used when quilting heavy fabrics, such as felt and other fabrics greater than 10 oz/$y^2$.

The primary template sectors 11A, 11B (LEFT 1 and RIGHT 1) are used in each of the various configurations. The template sectors 11A, 11B identify the inseams indicated at broken-lines 31, 32 that will join together all 4 pieces of cut fabric, as described below. The exemplary template sectors 11A, 11B, 12A, 12B, 13A, 13B, 14 and double-tab connector 40 may be fabricated (e.g., molded) of any suitable rigid or semi-rigid thermoplastic material, such as acrylic plastic.

Exemplary Quilting Process

Figure 7:
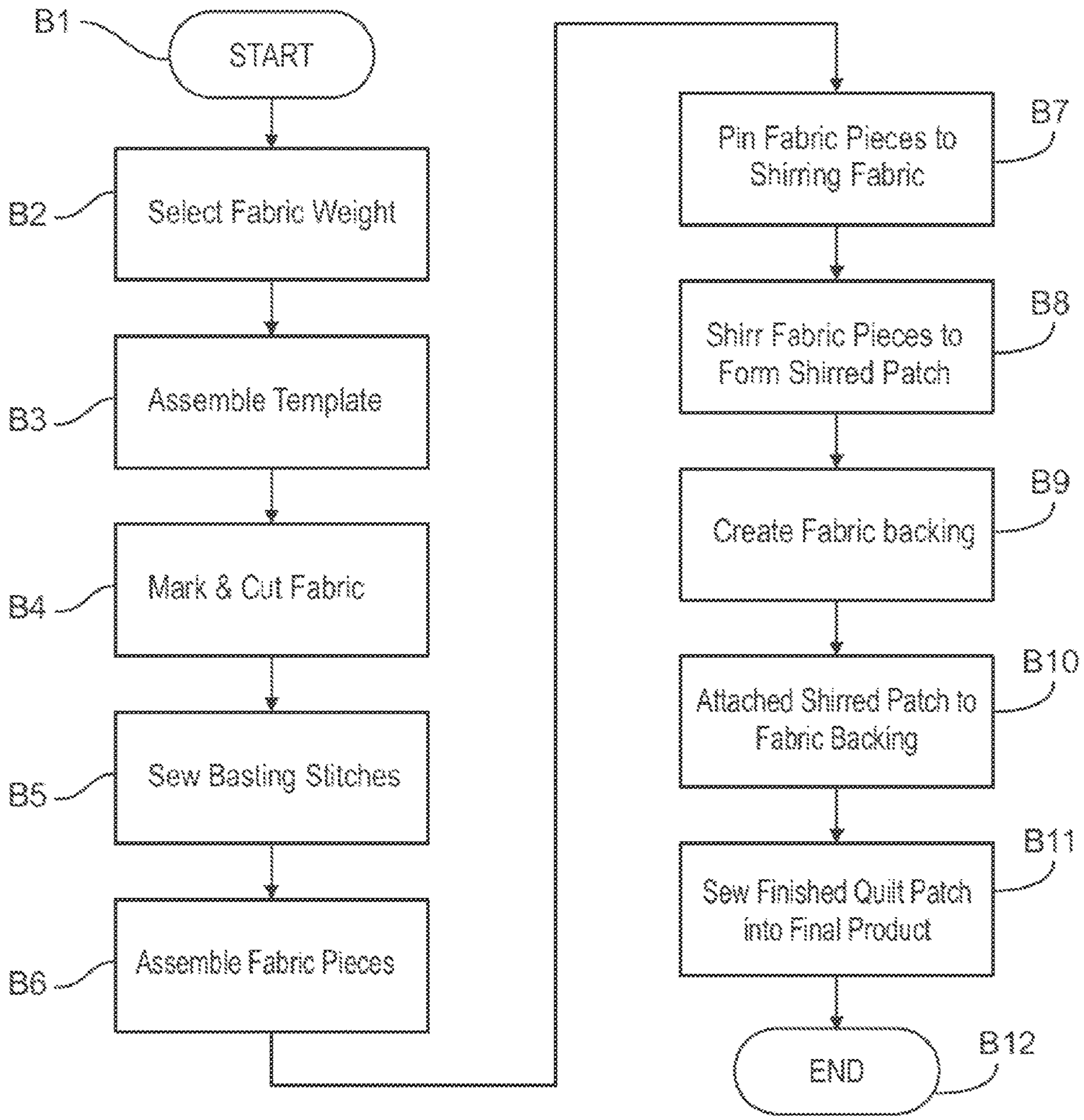
FIG. 7 is a block diagram illustrating an exemplary quilting process of the present disclosure.
Figure 8:
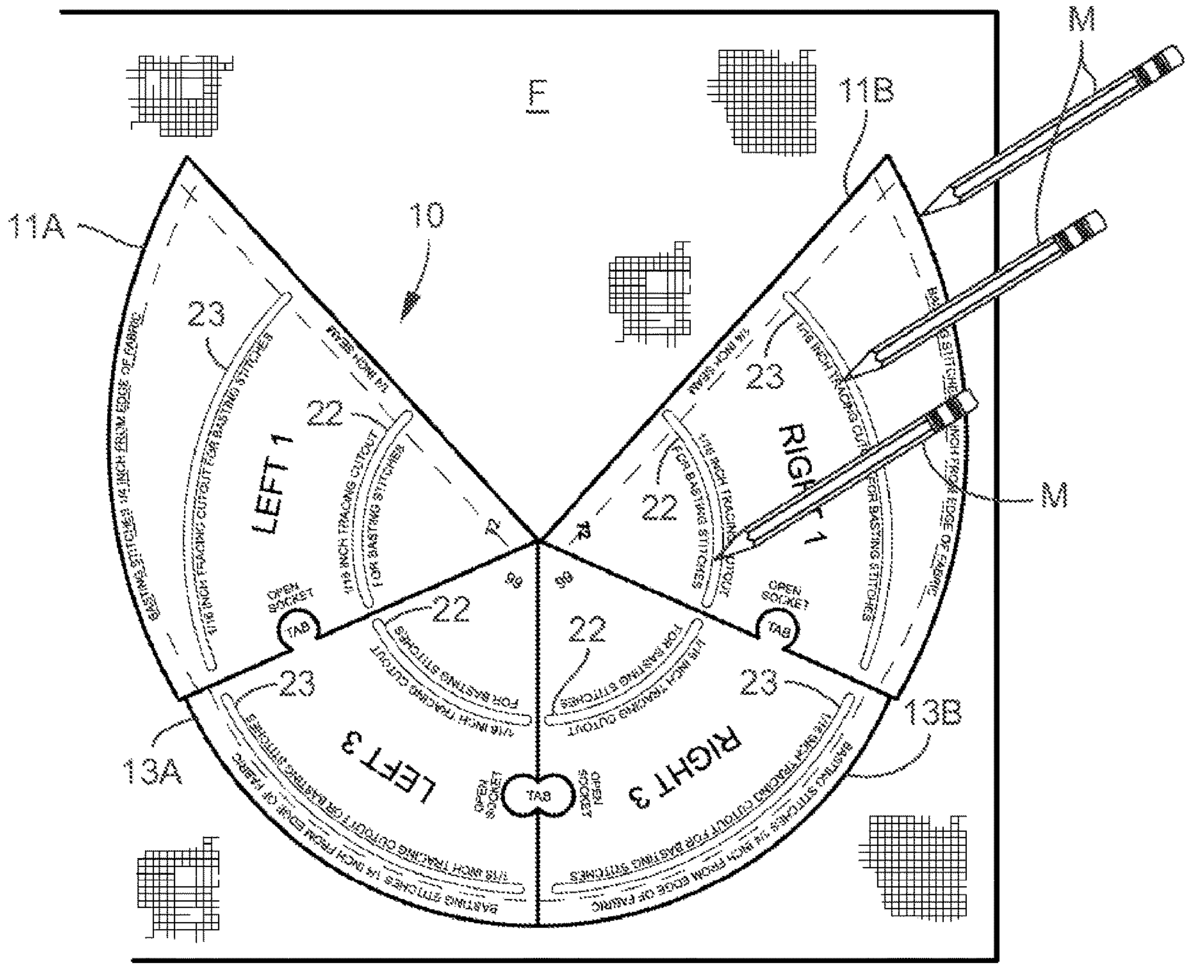
FIG. 8 demonstrates the step of using the exemplary quilt template to mark the selected fabric to be quilted.

The exemplary quilting process of the present disclosure is outlined broadly and generally in the block diagram of FIG. 7. The process begins by selecting a particular fabric to be quilted. See FIGS. 7, B1 and B2. In the present example, the selected fabric is a medium weight cotton fabric. The fabric is folded in half and laid flat on a supporting surface such that the finished fabric sides (referred to as "right sides") face one another while the unfinished fabric sides ("wrong sides") are exposed for marking. The particular template sectors are then selected and assembled based on the fabric weight. See FIG. 7, B3. As shown in FIG. 8, the custom quilt template is pieced together atop the fabric "F" using the primary template sectors 11A, 11B (LEFT 1 and RIGHT 1), template sectors 13A, 13B (LEFT 3 and RIGHT 3), and the double-tab connector 40.

Figure 9:
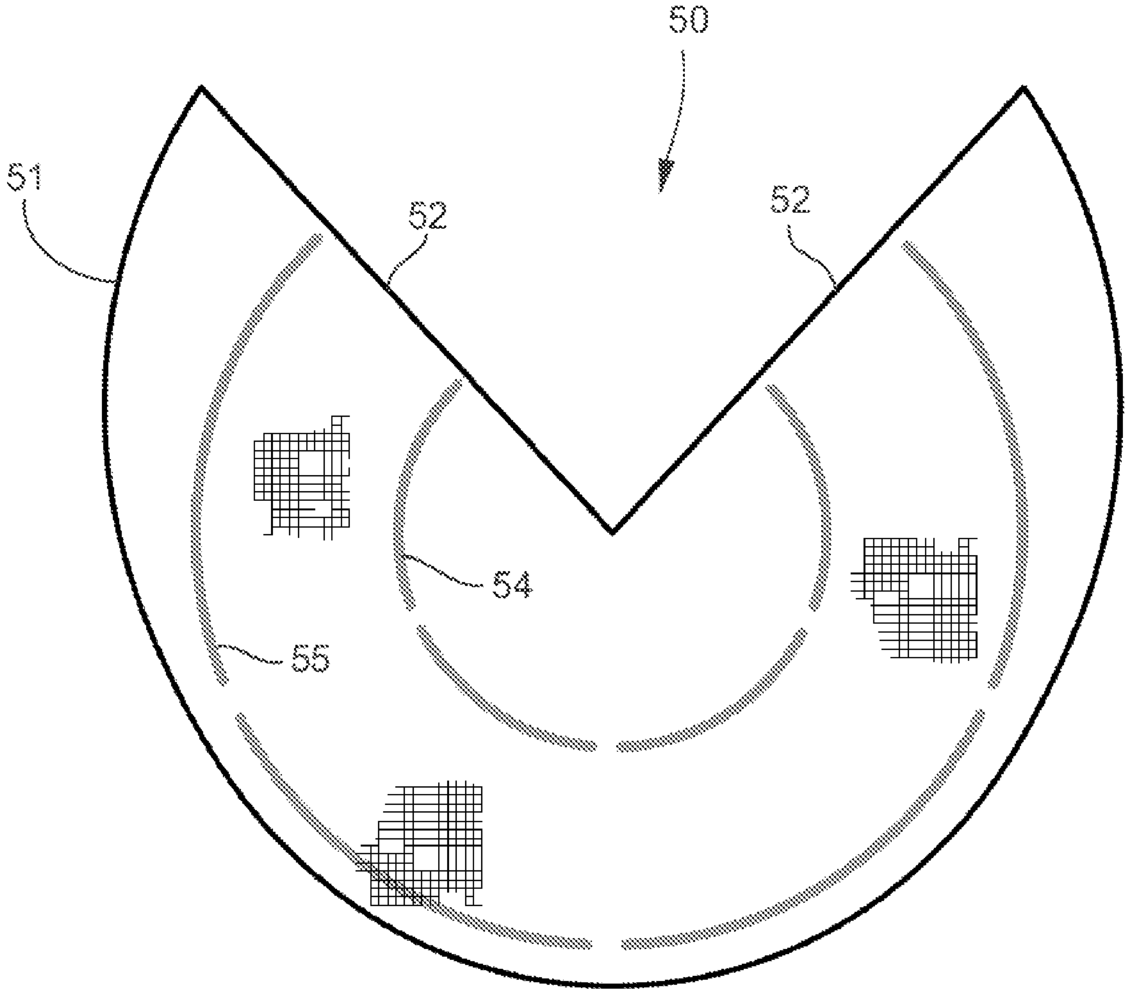
FIG. 9 shows a piece of marked and cut fabric.
Figure 10:
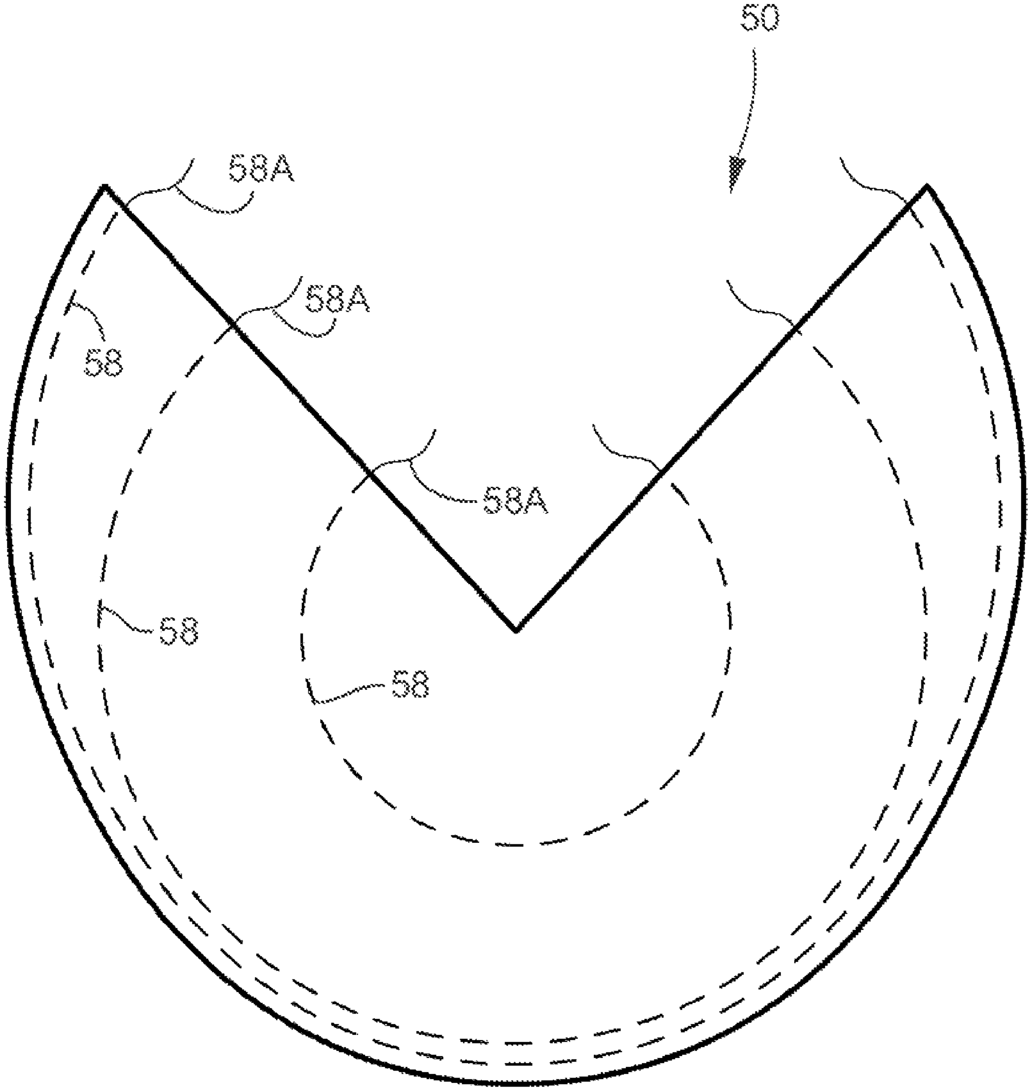
FIG. 10 shows the fabric piece after sewing the basting stitches.

Using a suitable marker "M", such as a #2 or HB pencil, the quilter traces the assembled quilt template onto the fabric "F" along an outside perimeter of the quilt template 10 and at the interior arc-shaped cutouts 22, 23 of the template sectors 11A, 11B, 13A, 13B. The pencil tracings are used to identify a marked perimeter, marked inseams, and marked interior arcs. As indicated at B4 of FIG. 7, the fabric "F" is then cut along the marked perimeter and marked inseams to form two identical fabric pieces 50A and 50B—each piece including a border 51 and inseams 52, and inner and outer arcs 54, 55 on its unfinished side. See FIG. 9 [indicating a single fabric piece at reference 50]. This step is repeated to create 4 identical marked fabric pieces 50A, 50B, 50C and 50D. Referring to FIGS. 7 and 10, with a sewing machine in an appropriate stitch setting (e.g., number 6), basting stitches 58 are sewn to each of the four fabric pieces 50A-50D on respective marked wrong sides—the basting stitches 58 running along the border 51 of each fabric piece 50A-50D and along the inner and outer arcs 54, 55 leaving long thread trails 58A at respective ends. See FIG. 7, B5 and FIG. 10. The thread trails 58A will be used later for shirring-up the fabric pieces 50A-50D. In the exemplary embodiment, the "border" is defined as being ¼ inch inside the peripheral edge of each fabric piece 50A-50D.

Figure 11A:
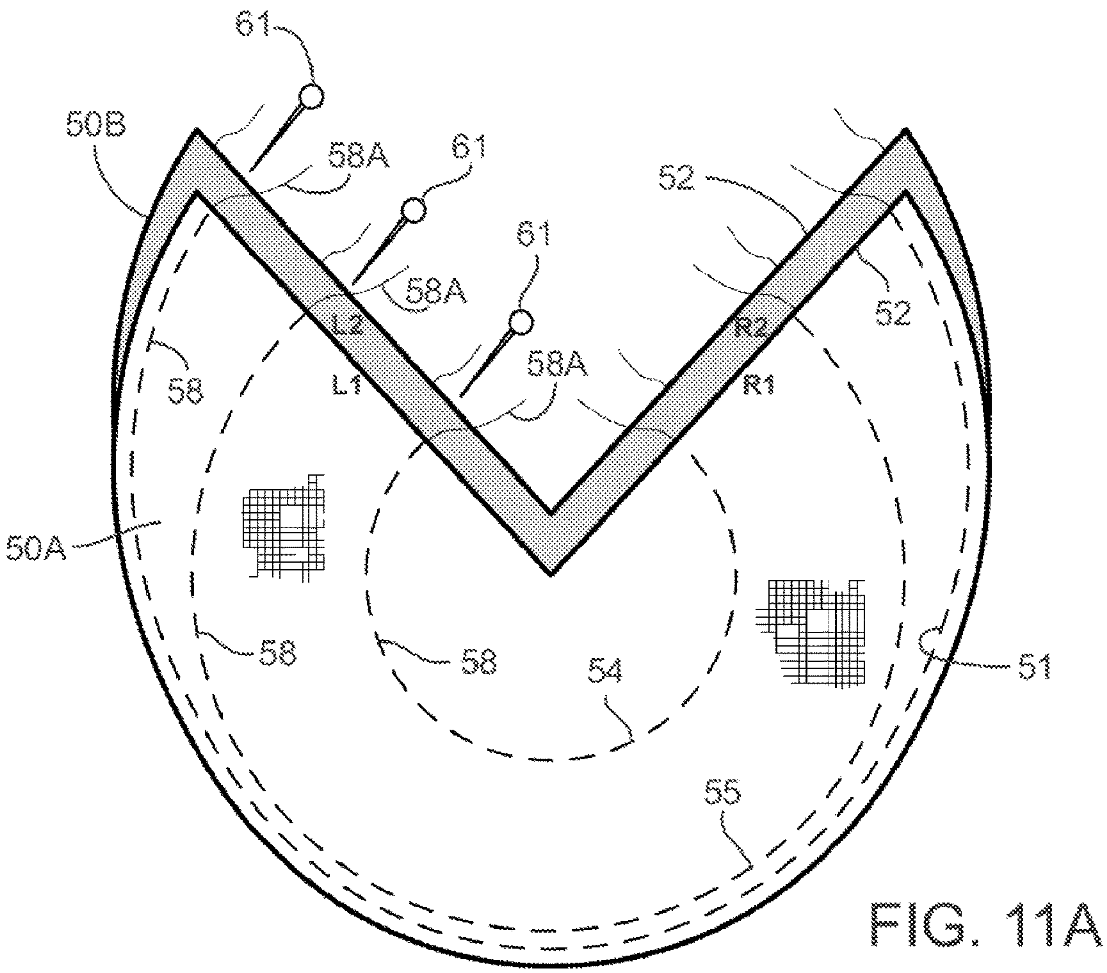
FIGS. 11A, 11B and 11C demonstrate the steps of assembling the 4 fabric pieces together at respective inseams.
Figure 11B:
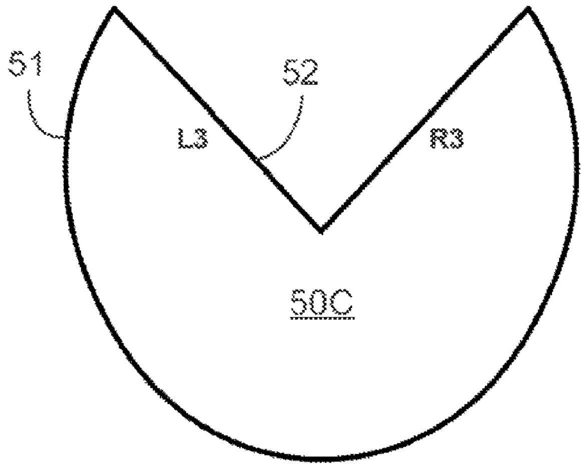
Figure 11C:
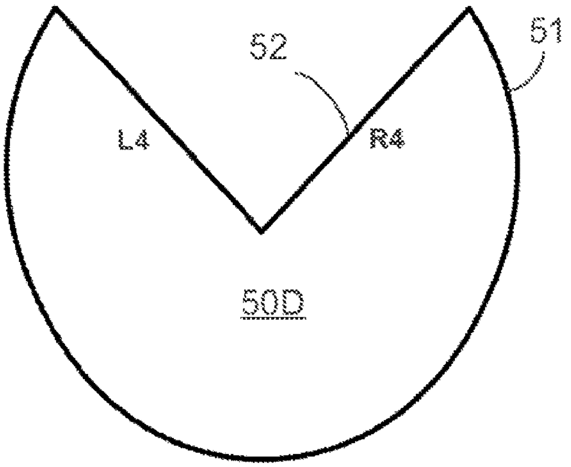
Figure 12:
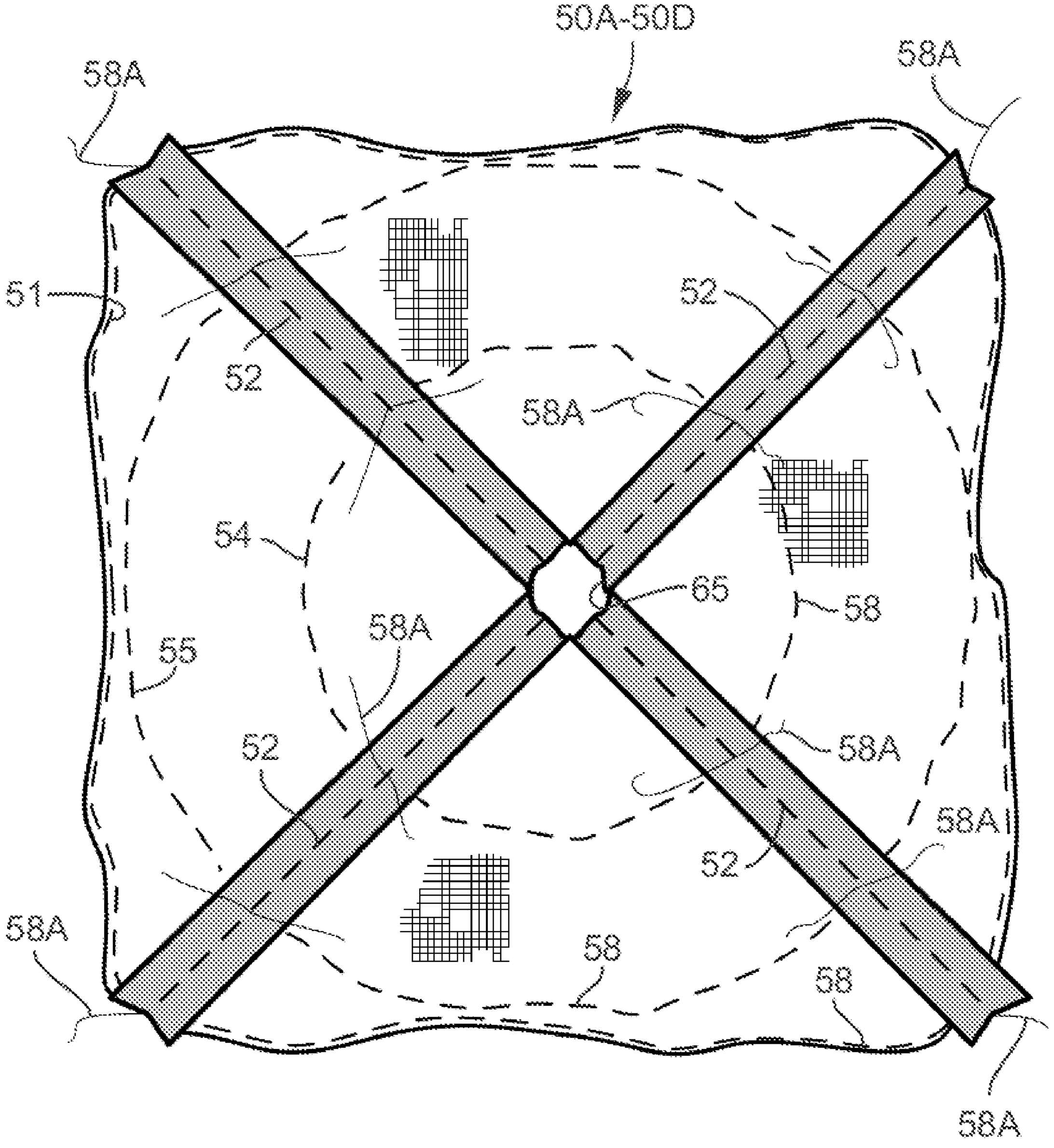
FIG. 12 shows the sewn-together fabric pieces with the inseams opened and flattened.

After adding the basting stitches 58, the four individual fabric pieces 50A-50D are pinned together at respective inseams 52. See FIG. 7, B6. As demonstrated in FIGS. 11A, 11B and 11C, two of the fabric pieces 50A, 50B are arranged with their finished sides facing one another (unfinished sides facing outward) while straight pins 61 are used to temporarily join the two pieces 50A, 50B together along aligned left inseams L1 and L2. The third fabric piece 50C is then joined in the assembly by pinning its left inseam L3 to the right inseam R1 of the first fabric piece 50A. The fourth fabric piece 50D is joined in the assembly by pinning its left inseam L4 to the right inseam R3 of the third fabric piece 50C, and pinning its right inseam R4 to the right inseam R2 of the second fabric piece 50B. Once fully assembled and pinned, the four fabric pieces 50A-50D form a generally circular shape with a large opening in the center. With the sewing machine at an appropriate stitch setting, such as a number 4, the quilter then sews each of the pinned inseams 52 together resulting in smaller (e.g., 0.5 inch) center opening 65 in the sewn together fabric pieces 50A-50D. See FIG. 12. The four inseams 52 are then opened and flattened with a hot iron. The sewn-together fabric pieces 50A-50D are now prepared for shirring.

Figure 13:
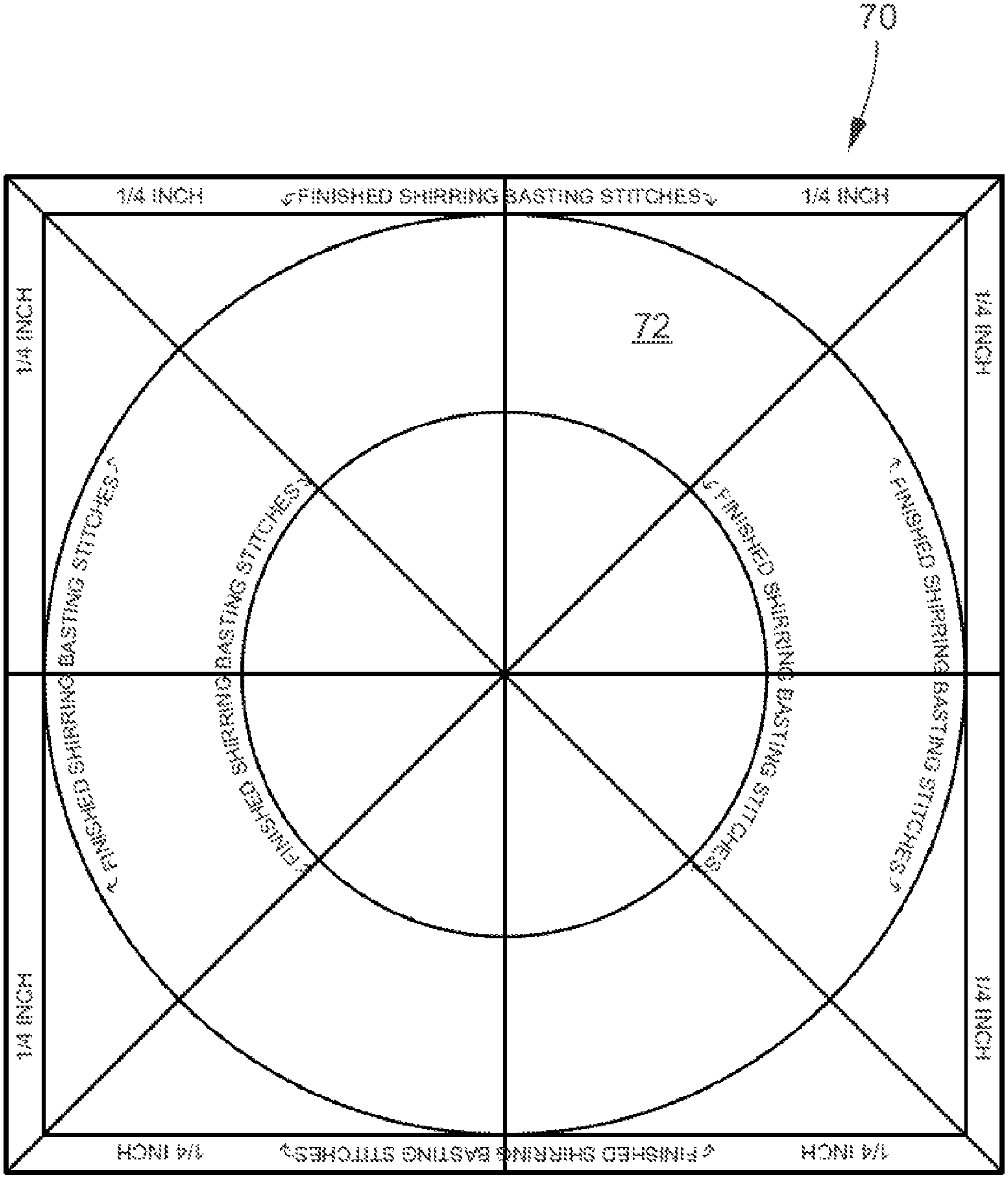
FIG. 13 is a plan view of the shirring base.
Figure 14:
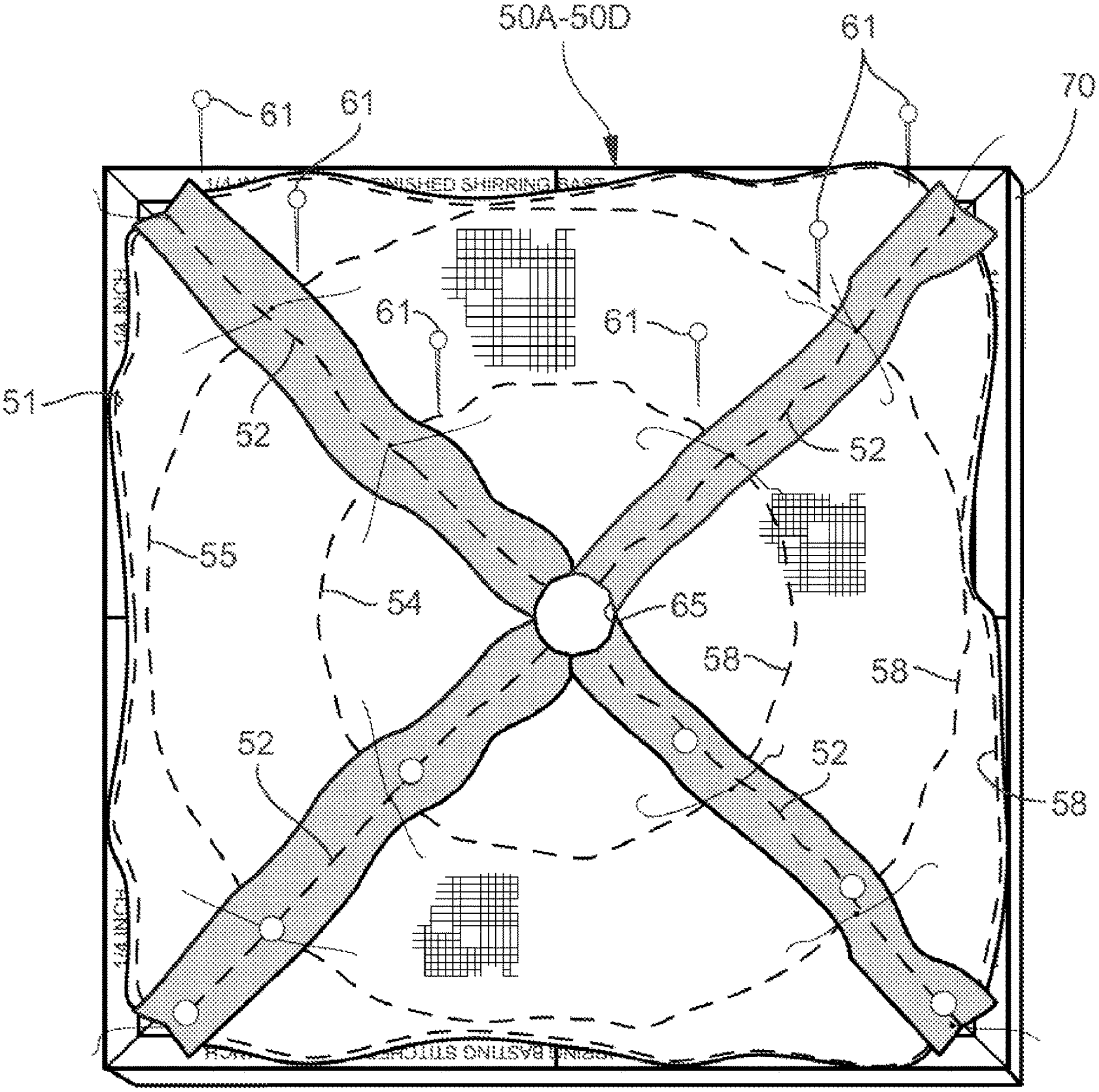
FIG. 14 is a perspective view showing the sewn-together fabric pieces temporarily mounted on the shirring base.

Referring to FIGS. 7, 13 and 14, to facilitate shirring the sewn-together fabric pieces 50A-50D may be temporarily mounted on a foam shirring base 70. See FIG. 7, B7. The shirring base 70 may be constructed of Styrofoam® or other suitable material, and is 1 to 2 inches deep and 8 to 10 inches square. The top face 72 of the exemplary shirring base 70 is shown in FIG. 13 and includes markings (lines and circles) to be used as a guide for temporarily pinning the sewn-together fabric pieces 50A-50D to the base 70 during the shirring process. Using a number of straight pins 61, the sewn-together fabric pieces 50A-50D are mounted finished sides down to the foam base 70 at each corner of the base 70, along each of the four inseams 52, and along each of the circular shirring lines formed by inner and outer arcs 54, 55. Once mounted and secured, the quilter identifies the basting thread trails 58A at each of the four inseams 52 and gently pulls the thread trails 58A to gradually shirr-up (or gather) the fabric at each of the four pieces 50A-50D. See FIG. 7, B9. The fabric pieces 50A-50D comprise three shirr sites at each inseam 52. The first site shirrs the fabric linearly from corner to corner and squares off the quilt patch along one side. The second and third sites are circular shirr sites at the inner and outer arcs 54, 55 of each fabric piece 50A-50D. After shirring, all thread trails 58A at the inseam shirr sites are tied-off with alternating square knots.

Optionally, a fabric (e.g., muslin) backing may be made and applied to the unfinished side of the sewn-together and shirred fabric pieces. See FIGS. 7, B9 and B10. In an exemplar embodiment, the fabric backing is created from a template with markings corresponding to those on the top face of the shirring base. These marking may be applied to the fabric backing using a straight-edge tool, such as a standard ruler, circle template and a #2 or HB pencil. With the shirred fabric pieces removed from the shirring base, the fabric backing is held against unfinished sides of shirred fabric pieces with its marked side facing out. The fabric backing is precisely arranged such that the marked diagonals align with the fabric inseams and the marked circles align with the shirred fabric circles. The fabric backing and shirred fabric pieces are then pinned together using a number of straight pins along an square outside perimeter, at the fabric seams and shirred circles. The shirring folds and fullness are feathered in evenly between each inseam during the pinning process.

Figure 15:
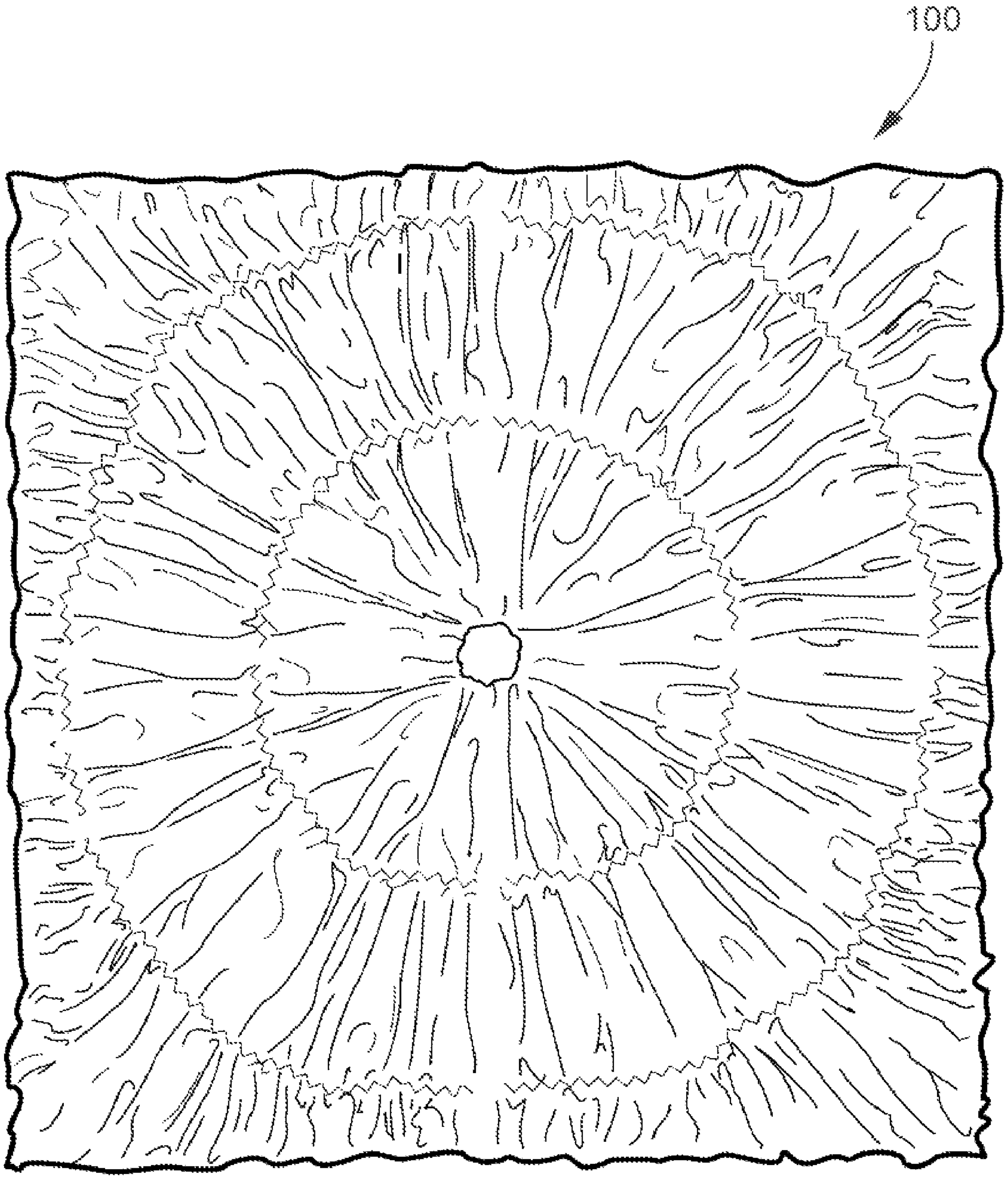
FIG. 15 is a plan view of the finished three-dimensional shirred quilt patch.
Figure 16:
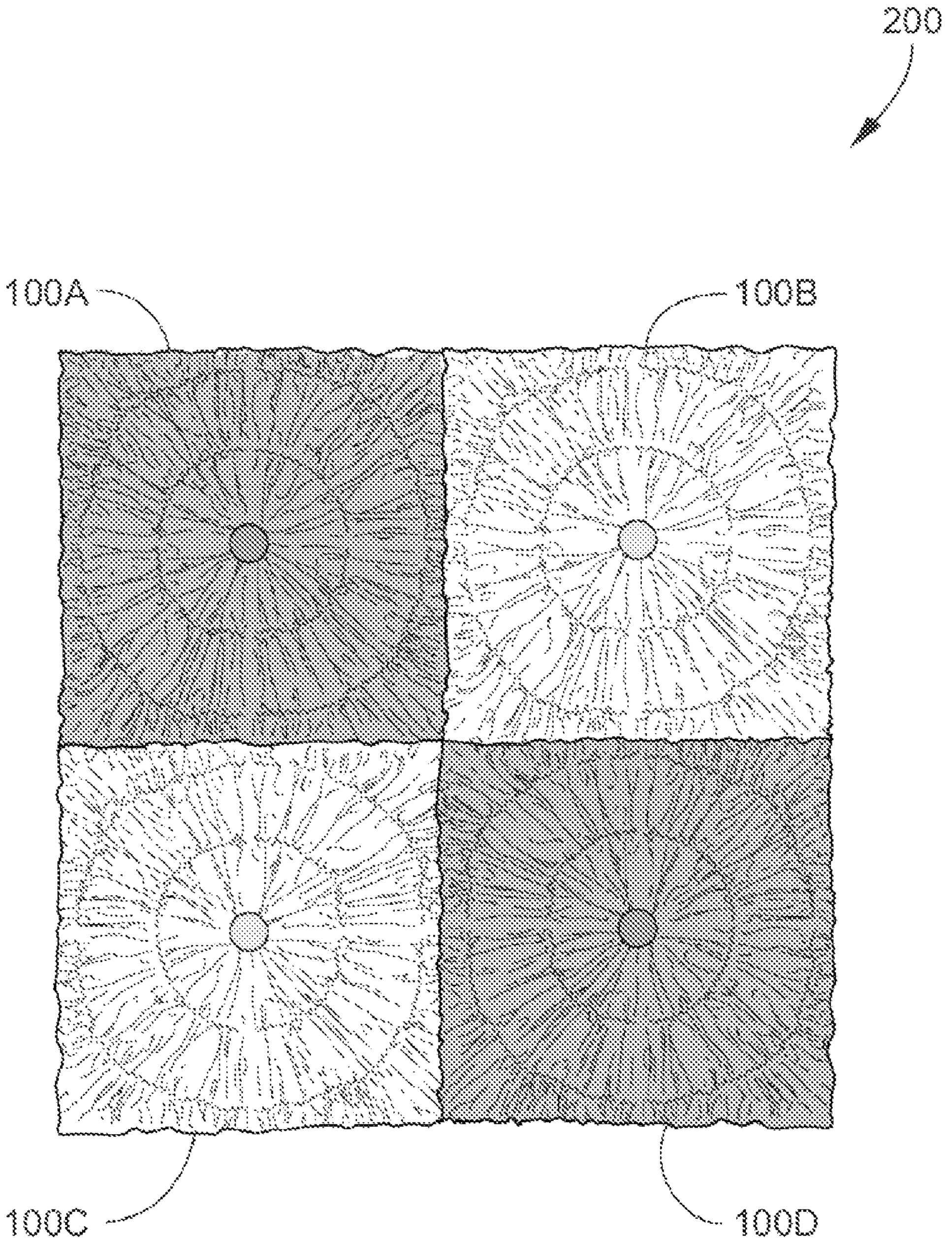
FIG. 16 shows the present quilt patch incorporated with like patches in a quilted article.

After pinning, the fabric backing is permanently attached using long and wide zigzag stitching along each the four straight edges of the square perimeter. The shirred fabric pieces are then stretched on the square fabric backing and held firmly as the two shirred circular patterns are sewn. A recommended finishing stitch on the circular patterns is either the traditional basting stitch (number 6 stitch setting) or a long and zigzag stitch. It is recommended to leave a 0.5 inch opening in the center of resulting three-dimensional shirred quilt patch. This may reduce puckering on the square fabric backing, thereby preserving the circular design. As shown in FIGS. 15 and 16, after completing the three-dimensional shirred quilt patch 100, it may be incorporated with like patches 100A-100D into any desired finished article 200 such as a blanket, bed spread, pillow cover, or the like. See FIGS. 7, B11 and B12.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under 35 U.S.C. § 112(f) [or 6th paragraph/pre-AIA] is not intended. Additionally, it is not intended that the scope of patent protection afforded the present invention be defined by reading into any claim a limitation found herein that does not explicitly appear in the claim itself.

What is claimed:

1. A custom piece-together quilt template, comprising:

a first template sector having an outer edge, converging side edges, a sector point at a convergence of said side edges, and a planar body;

a second template sector configured to reside adjacent said first template sector, and having an outer edge, converging side edges, a sector point at a convergence of said side edges, and a planar body, and wherein both sector points of said first and second template sectors are located a centerpoint of said quilt template when assembled; and adjoining elements located on said first and second template sectors for temporarily joining said first and second template sectors together when using said quilt template.

2. The custom piece-together quilt template according to claim 1, wherein said converging side edges of at least one of said first and second template sectors define an angle of approximately 72 degrees.

3. The custom piece-together quilt template according to claim 1, wherein said converging side edges of at least one of said first and second template sectors define an angle of approximately 34 degrees.

4. The custom piece-together quilt template according to claim 1, wherein said converging side edges of at least one of said first and second template sectors define an angle of approximately 25 degrees.

5. The custom piece-together quilt template according to claim 1, wherein said converging side edges of at least one of said first and second template sectors define an angle of approximately 66 degrees.

6. The custom piece-together quilt template according to claim 1, wherein each of said first and second template sectors defines radially spaced inner and outer arc-shaped cutouts.

7. The custom piece-together quilt template according to claim 1, wherein said adjoining elements comprise a complementary tab and socket formed with respective adjacent side edges of said template sectors.

8. The custom piece-together quilt template according to claim 1, wherein said first and second template sectors are formed of a rigid thermoplastic material.

9. A custom piece-together quilt template, comprising:

at least 3 template sectors each having an outer edge, converging side edges, a sector point at a convergence of said side edges, and wherein all sector points of said at least three template sectors are located a centerpoint of said quilt template when assembled; and adjoining elements located on adjacent template sectors for temporarily joining adjacent template sectors together when using said quilt template.

10. The custom piece-together quilt template according to claim 9, wherein said converging side edges of at least one of said at least three template sectors define an angle selected from a group consisting of approximately 72 degrees, approximately 34 degrees, approximately 25 degrees and approximately 66 degrees.

11. The custom piece-together quilt template according to claim 9, wherein each of said template sectors defines radially spaced inner and outer arc-shaped cutouts.

12. The custom piece-together quilt template according to claim 9, wherein said adjoining elements comprise a complementary tab and socket formed with respective adjacent side edges of said template sectors.

13. The custom piece-together quilt template according to claim 9, wherein said template sectors are formed of a rigid thermoplastic material.

14. A method for quilting, comprising:

selecting a fabric to be quilted;

assembling a custom piece-together quilt template based on a relative weight of the fabric, the quilt template comprising:

(i) a first template sector having an outer edge, converging side edges, a sector point at a convergence of the side edges, and a planar body; and (ii) a second template sector configured to reside adjacent the first template sector, and having an outer edge, converging side edges, a sector point at a convergence of the side edges, and a planar body;

using a marker, tracing the assembled quilt template onto the fabric along an outside perimeter of the quilt template, the tracing identifying a marked perimeter and marked inseams;

cutting the fabric along the marked perimeter and marked inseams to form a smaller fabric piece;

repeating the marking and cutting steps to create multiple identical fabric pieces, each fabric piece comprising a border and an inseam;

adding basting stitches at the border of each fabric piece, the basting stitches comprising thread trails at respective ends of the border;

sewing the multiple fabric pieces together along respective inseams;

shirring the assembled fabric pieces by pulling and tying off the thread trails, thereby creating a three-dimensional quilt patch; and incorporating the three-dimensional quilt patch into a finished article.

* * * * *